(12) United States Patent
Zhu

(10) Patent No.: US 11,515,798 B2
(45) Date of Patent: Nov. 29, 2022

(54) FLYBACK SWITCHING POWER SUPPLY FOR ADJUSTING A CHIP WORKING FREQUENCY

(71) Applicant: Globe (Jiangsu) Co., Ltd, Jiangsu (CN)

(72) Inventor: Yanqiang Zhu, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 63 days.

(21) Appl. No.: 17/117,415

(22) Filed: Dec. 10, 2020

(65) Prior Publication Data
US 2021/0175813 A1      Jun. 10, 2021

(30) Foreign Application Priority Data

Dec. 10, 2019   (CN) .......................... 201911255833.1

(51) Int. Cl.
*H02M 3/335* (2006.01)

(52) U.S. Cl.
CPC ............................. *H02M 3/33523* (2013.01)

(58) Field of Classification Search
None
See application file for complete search history.

(56) References Cited

U.S. PATENT DOCUMENTS

| 6,229,366 | B1* | 5/2001 | Balakirshnan | H03K 3/0231 327/143 |
| 6,545,451 | B2* | 4/2003 | Jung | H02M 3/33523 323/283 |
| 6,768,655 | B1* | 7/2004 | Yang | H02M 1/4225 363/21.01 |
| 7,521,878 | B2* | 4/2009 | Green | H05B 47/18 315/308 |
| 2009/0206814 | A1 | 8/2009 | Zhang et al. | |

(Continued)

FOREIGN PATENT DOCUMENTS

| CN | 202231629 U | 5/2012 |
| CN | 106558976 A | 4/2017 |

(Continued)

OTHER PUBLICATIONS

Extended European Search Report of counterpart European Patent Application No. 20212985.4 dated Apr. 21, 2021.

*Primary Examiner* — Jeffrey A Gblende

(57) ABSTRACT

The invention discloses a flyback switching power supply, including a power input and rectifying circuit; a DC-DC switching circuit, the DC-DC switching circuit comprising a PWM control integrated circuit; and a voltage and current feedback circuit. The PWM control integrated circuit comprises a chip working frequency setting pin for setting a working frequency of the PWM control integrated circuit, the flyback switching power supply further comprises a frequency adjustment circuit connected between the chip working frequency setting pin of the PWM control integrated circuit and the voltage and current feedback circuit, and the frequency adjustment circuit is configured to decrease the working frequency when the flyback switching power supply is under a low load condition, and increase the working frequency when the flyback switching power supply is under a high load condition.

11 Claims, 2 Drawing Sheets

(56) References Cited

U.S. PATENT DOCUMENTS

| | | | |
|---|---|---|---|
| 2016/0149504 A1* | 5/2016 | Quigley | H02M 1/36 363/21.04 |
| 2016/0308448 A1* | 10/2016 | Nishijima | H02M 3/33523 |
| 2018/0351464 A1 | 12/2018 | Finkel et al. | |
| 2019/0273443 A1 | 9/2019 | Tian et al. | |

FOREIGN PATENT DOCUMENTS

| | | | |
|---|---|---|---|
| CN | 206389269 U | * | 8/2017 |
| CN | 206389269 U | | 8/2017 |

\* cited by examiner

FLYBACK SWITCHING POWER SUPPLY FOR ADJUSTING A CHIP WORKING FREQUENCY

CROSS-REFERENCE TO RELATED INVENTIONS

This invention claims the priority of CN application Ser. No. 201911255833.1, filed on Dec. 10, 2019, the disclosures of which are hereby incorporated by reference in their entirety.

TECHNICAL FIELD

The present invention relates to a control circuit, particularly to a control circuit of a flyback switching power supper.

BACKGROUND ART

In the manufacture of the electrical equipment, compared to traditional transformer step-down linear power supplies, switching power supplies have the advantages of small size, light weight, high efficiency, and energy saving. The power supply can be adapted to AC power supply or DC power supply, and has a wide range of supply voltage. As a result, the switching power supplies are becoming more and more widely used.

At present, most of the low-power switching power supplies on the market use flyback switching power supplies. When used in a variety of different situations, the existing flyback switching power supply cannot change the working frequency according to the working environment or scene, which may cause temperature rise of some power device. Especially when working at higher environment temperature, it is easy to result in product losses.

In view of the above, there is a need to provide an improved flyback switching power supply to solve the problem.

SUMMARY OF INVENTION

One objective of the present invention is to provide a flyback switching power supply, which can be adapted to different working environments, and the working frequency thereof can be switched in real time according to the working environment.

In order to achieve the above object, the present invention provides a flyback switching power supply, comprising a power input and rectifying circuit; a DC-DC switching circuit, the DC-DC switching circuit comprising a PWM control integrated circuit; and a voltage and current feedback circuit. The PWM control integrated circuit comprises a chip working frequency setting pin for setting a working frequency of the PWM control integrated circuit, the flyback switching power supply further comprises a frequency adjustment circuit connected between the chip working frequency setting pin of the PWM control integrated circuit and the voltage and current feedback circuit, and the frequency adjustment circuit is configured to decrease the working frequency when the flyback switching power supply is under a low load condition, and increase the working frequency when the flyback switching power supply is under a high load condition.

As a further improvement of the invention, the frequency adjustment circuit comprises a primary side module and a secondary side module, the primary side module comprises a resistor RD and a light-receiving device UQB of an optical coupler I, and the secondary side module comprises a light-emitting device UQA of the optical coupler I.

As a further improvement of the invention, one end of the resistor RD is connected to the chip working frequency setting pin and the other end of the resistor RD is connected to a collector of the light-receiving device UQB of the optical coupler I.

As a further improvement of the invention, the secondary side module comprises a resistor RSS, a diode DS, an operational amplifier USC, a resistor RSA, a resistor RSB, a resistor RSC, a resistor RSD, and a diode DS1; the cathode of the light-emitting device UQA of the optical coupler I is grounded, and the anode is connected to one end of the resistor RSS; the other end of the resistor RSS is connected to the cathode of the diode DS, and the anode of the diode DS is respectively connected to the anode of another diode DS1, one end of the resistor RSB and an output pin 1 of the operational amplifier USC; the out-of-phase input pin 2 of the operational amplifier USC is connected with the resistor RSB and the resistor RSA, and the in-phase input pin 3 is grounded through the resistor RSC; the other end of the resistor RSA is grounded, and the resistor RSD is connected between the resistor RSA and the resistor RSC.

As a further improvement of the invention, the flyback switching power supply further comprises a FB signal feed back module connected between a FB pin of the PWM control integrated circuit and the voltage and current feedback circuit.

As a further improvement of the invention, the FB signal feed back module comprises an optical coupler II, a resistor and a diode DS1; and the optical coupler II comprises a light-emitting device U5A and a light-receiving device U5B.

As a further improvement of the invention, a cathode of the light-emitting device U5A is connected respectively with the resistor RSA and the resistor RSD and being grounded, an anode the light-emitting device U5A is connected to a resistor RSF; the other end of the resistor RSF is connected with a resistor RSK and the other end of the resistor RSK is connected with a negative electrode of the diode DS1.

As a further improvement of the invention, an emitter of the light-receiving device U5B of the optical coupler II is connected to an emitter of the light-receiving device UQB of the optical coupler I, and a collector thereof is connected to the FB pin of the PWM control integrated circuit.

As a further improvement of the invention, the optical coupler II and the capacitor C2 are parallel connected between the FB pin and the chip working frequency setting pin of the PWM control integrated circuit U1.

As a further improvement of the invention, the flyback switching power supply comprises a resistor R11 connected to the chip working frequency setting pin of the PWM control integrated circuit, and the frequency adjustment circuit comprises a resistor RD connected in parallel with the resistance R11 to form an frequency setting resistor of the PWM control integrated circuit.

As a further improvement of the invention, the frequency adjustment circuit comprises an optical coupler I configured as: when the flyback switching power supply is under a high load condition, a light-emitting device UQA of the optical coupler I is on, a light-receiving device UQB of the optical coupler I is turned on, so that the resistor RD in the frequency adjustment circuit is enabled.

As a further improvement of the invention, the frequency adjustment circuit comprises an optical coupler I configured as: when the flyback switching power supply is under a low load condition, a light-emitting device UQA of the optical coupler I is off, a light-receiving device UQB of the optical coupler I is off, so that the resistor RD in the frequency adjustment circuit is not enabled.

As a further improvement of the invention, the flyback switching power supply further comprises a FB signal feed back module connected to FB pin of the PWM control integrated circuit, and wherein the FB signal feed back module comprises an optical coupler II connected parallel with the resistor R11 and at least one resistor RSF.

The beneficial effects of the present invention are: after the frequency adjustment circuit is introduced into the flyback switching power supply of the present invention, it can work in a variable frequency state. Working at low frequency under low load condition makes the flyback switching power supply more energy-saving; and working at high frequency under a high load condition makes the temperature rise of the flyback switching power supply is reduced and the output capability is improved. Therefore, the applicable occasions of the flyback switching power supply of the present invention become more extensive and the product is reliable.

The above general description and the following detailed description are intended to be illustrative and not restrictive.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with present invention. On the contrary, they are only examples of devices, systems, machines, and methods consistent with some aspects of the invention as detailed in the appended claims.

Figure 1:
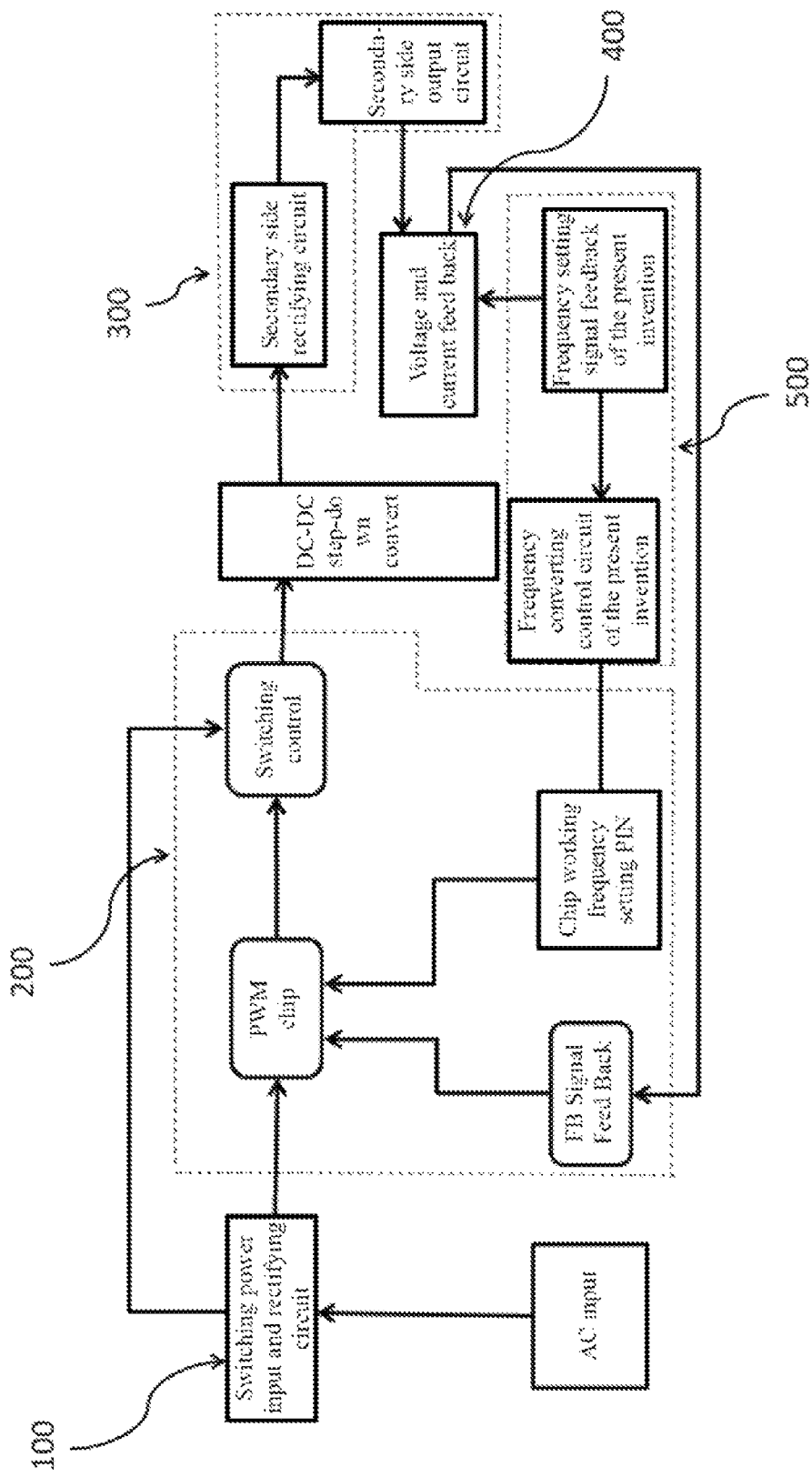
FIG. 1 is an operation diagram of a flyback switching power supply according to the present invention.

Referring to FIG. 1, the present invention discloses a flyback switching power supply, including a switching power input and rectifying circuit 100, a DC-DC switching circuit 200, a secondary rectifying and output circuit 300, a voltage and current feedback circuit 400, and a frequency adjustment circuit 500. The DC-DC switching circuit 200 includes a PWM control integrated circuit U1. The PWM control integrated circuit U1 includes the GND, FB, Vin, RI, RT, Sense, VDD, and Gate pins. The frequency adjustment circuit 500 is connected between the FB and RI pins, for changing the working frequency of the flyback switching power supply according to the working state of the flyback switching power supply. When the flyback switching power supply is under low loaded condition, the frequency adjustment circuit 500 will decrease the working frequency; when the flyback switching power supply is under high loaded condition, the frequency adjustment circuit 500 will increase the working frequency. The circuit is described in detail below.

Figure 2:
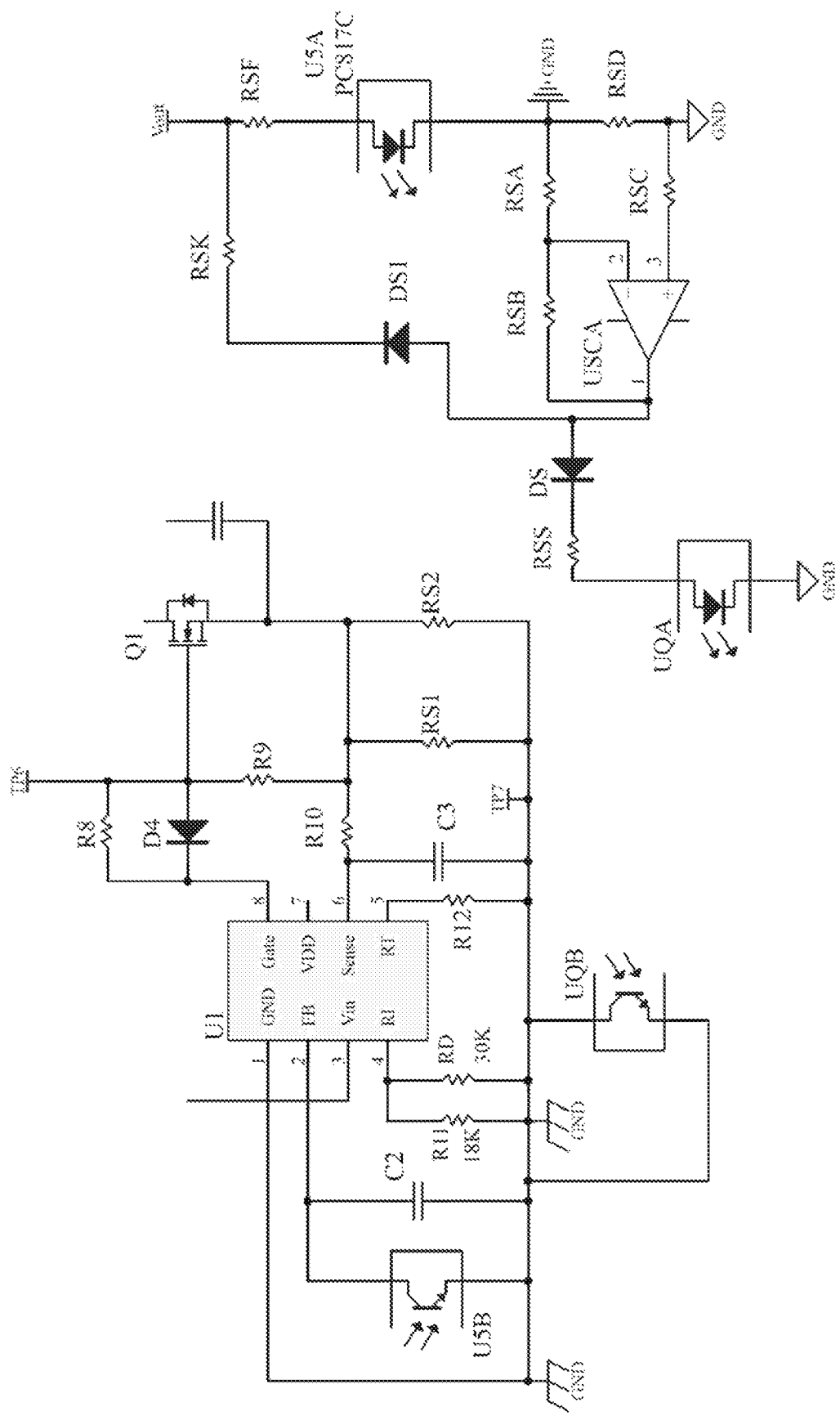
FIG. 2 is a circuit diagram of the flyback switching power supply shown in FIG. 1.

Referring to FIG. 2, the pin 1 (i.e. the GND pin) of the PWM control integrated circuit U1 is grounded. The pin 2 (i.e. the FB pin) of the PWM control integrated circuit U1 is connected to the voltage and current feedback circuit 400. The voltage and current feedback circuit 400 includes a capacitor C2 and an optical coupler I connected in parallel. The other end of the capacitor C2 is connected to the resistor R11 and then connected to the pin 4 (i.e. the RI pin) of the PWM control integrated circuit U1. The pin 5 (i.e. the RT pin) of the PWM control integrated circuit U1 is connected to the resistor R12, and the other end of the resistor R12 is connected to the resistor R11. A resistor R12 and a capacitor C3 are arranged in parallel between the RT pin of the PWM control integrated circuit U1 and the pin 6 (i.e. the Sense pin). The end of the capacitor C3 connected to the Sense pin is also connected to one end of the resistor R10. The other end of the resistor R10 is connected to the resistor R9, the resistor RS1, and the resistor RS2. The other end of the resistor R9 is connected to pin 8 of the PWM control integrated circuit U1 (i.e. the Gate pin) through the resistor R8. A diode D4 is also connected in parallel between the Gate pin and the resistor R9. The resistor RS1 and the resistor RS2 are connected in parallel between the resistor R10 and the capacitor C3. Generally, the working frequency of the flyback switching power supply can be determined by adjusting the resistance value of the resistor R11, but the resistance value is unchangable once it is determined. The introduction of the frequency adjustment circuit 500 of the present invention solves this problem.

The frequency adjustment circuit 500 includes a primary side module and a secondary side module. The primary side module includes a resistor RD and a light receiving device UQB of the optical coupler I. One end of the resistor RD is connected to the RI pin and the other end is connected to a collector of the light receiving device UQB of the optical coupler I. The secondary side module includes a light-emitting device UQA of the optical coupler I, a resistor RSS, a diode DS, an operational amplifier USC, a resistor RSA, a resistor RSB, a resistor RSC, a resistor RSD, and a diode DS1. The cathode of the light-emitting device UQA of the optical coupler I is grounded, and the anode is connected to the resistor RSS. The light-emitting device UQA and the light receiving device UQB constitute a complete optical coupler I. The other end of the resistor RSS is connected to the cathode of the diode DS, and the anode of the diode DS is respectively connected to the anode of the diode DS1, one end of the resistor RSB, and the output pin 1 of the operational amplifier USC. The out-of-phase input pin 2 of the operational amplifier USC is connected with the resistor RSB and the resistor RSA, and the in-phase input pin 3 is grounded through the resistor RSC. The other end of the resistor RSA is grounded, and the resistor RSD is arranged between the resistor RSA and the resistor RSC. The resistor RSA is also connected to the cathode of the light-emitting device U5A of the optical coupler II, the anode of the light-emitting device U5A of the optical coupler II is connected to the resistor RSF. The other end of the resistor RSF is connected to the resistor RSK, and the other end of the resistor RSK is connected to the negative electrode of the diode DS1. The light-emitting device U5A of the optical coupler II, the resistor RSF, the resistor RSK, and the diode DS1 together constitute a signal multiplexing circuit, which is used to control the output of the no-load voltage and the constant current. The light-emitting device U5A and the light-receiving device U5B are combined into a complete optical coupler II.

In operation, according to the output current, a changing level signal can be output at pin 1 of the operational amplifier USC in the secondary side module, and the amplified level signal drives the light-emitting device UQA of the optical coupler I. When current passes through the light-emitting device UQA of the optical coupler I, the light receiving device UQB of the optical coupler I is turned on, so that the resistor RD is applied in the frequency adjustment circuit 500. In other words, the resistor RD and the original resistor R11 together form a frequency adjustment resistor, which is used to change the level of the RI pin of the PWM control integrated circuit U1 and change the parameters of the RC oscillator circuit inside the chip, so as to adjust the working frequency. In the signal multiplexing circuit, the output signal of the pin 1 of the operational amplifier USC is multiplexed through the diode DS1, thereby leading to the no-load voltage output and constant current output. The circuit design and system omits additional comparators or operational amplifiers.

In the preferred embodiment, at least one of the optical coupler I and the optical coupler II in the circuit adopts highspeed optical coupler.

In the preferred embodiment, the change of the circuit working frequency should be controlled within 20% of the recommended working frequency of the main control chip, so that the circuit can work stably.

As can be seen from the above description, the frequency adjustment circuit 500 is configured to: when the output current of the flyback switching power supply changes, by introducing a resistor RD, the resistance RD and the resistance R11 are connected in parallel to form an frequency setting resistor of the PWM control integrated circuit U1, so as to achieve the purpose of adjusting the working frequency of the flyback switching power supply. At the same time, the frequency adjustment circuit 500 employs the optical coupler I. When there is current passing through the light-emitting device UQA of the optical coupler I, the light-receiving device UQB is on, so that the resistor RD is added to the frequency adjustment circuit 500.

The flyback switching power supply of the present invention comprises the frequency adjustment circuit 500, and it can achieve a variable frequency working state. When the flyback switching power supply works under low load, 50% load and high load, the frequency adjustment circuit 500 will adjust the flyback switching power supply to be at adaptive frequencies, with a low working frequency under a low load condition and a high working frequency under a high load condition. This setting enables the flyback switching power supply to save more energy under a low load condition, and lower the temperature rise and achieve higher output capacity under a high load condition.

The above embodiment is only used to illustrate present invention and not to limits the technical solutions described in present invention. The understanding of this specification should be based on those skilled in the art, although present invention has been described in detail with reference to the above embodiment. However, those skilled in the art should understand that those skilled in the art can still modify or equivalently replace present invention, and all technical solutions and improvements that do not depart from the spirit and scope of present invention should be within the scope of the claims of the invention.

What is claimed is:

1. A flyback switching power supply, comprising:
    a power input and rectifying circuit;
    a DC-DC switching circuit, the DC-DC switching circuit comprising a PWM control integrated circuit; and
    a voltage and current feedback circuit,
    wherein, the PWM control integrated circuit comprises a chip working frequency setting pin for setting a working frequency of the PWM control integrated circuit, the flyback switching power supply further comprises a frequency adjustment circuit connected between the chip working frequency setting pin of the PWM control integrated circuit and the voltage and current feedback circuit, and the frequency adjustment circuit is configured to decrease the working frequency when the flyback switching power supply is under a low load condition, and increase the working frequency when the flyback switching power supply is under a high load condition;
    wherein the frequency adjustment circuit comprises a primary side module and a secondary side module, the primary side module comprises a resistor RD and a light-receiving device UQB of an optical coupler I, and the secondary side module comprises a light-emitting device UQA of the optical coupler I;
    wherein one end of the resistor RD is connected to the chip working frequency setting pin and the other end of the resistor RD is connected to a collector of the light-receiving device UQB of the optical coupler I.

2. The flyback switching power supply according to claim 1, wherein the secondary side module comprises a resistor RSS, a diode DS, an operational amplifier USC, a resistor RSA, a resistor RSB, a resistor RSC, a resistor RSD, and a diode DS1; the cathode of the light-emitting device UQA of the optical coupler I is grounded, and the anode is connected to one end of the resistor RSS; the other end of the resistor RSS is connected to the cathode of the diode DS, and the anode of the diode DS is respectively connected to the anode of another diode DS1, one end of the resistor RSB and an output pin 1 of the operational amplifier USC; the out-of-phase input pin 2 of the operational amplifier USC is connected with the resistor RSB and the resistor RSA, and the in-phase input pin 3 is grounded through the resistor RSC; the other end of the resistor RSA is grounded, and the resistor RSD is connected between the resistor RSA and the resistor RSC.

3. The flyback switching power supply according to claim 2, wherein the flyback switching power supply further comprises a FB signal feed back module connected between a FB pin of the PWM control integrated circuit and the voltage and current feedback circuit.

4. The flyback switching power supply according to claim 3, wherein the FB signal feed back module comprises an optical coupler II, a resistor and a diode DS1; and the optical coupler II comprises a light-emitting device USA and a light-receiving device USB.

5. The flyback switching power supply according to claim 4, wherein a cathode of the light-emitting device USA is connected respectively with the resistor RSA and the resistor RSD and being grounded, an anode the light-emitting device USA is connected to a resistor RSF; the other end of the resistor RSF is connected with a resistor RSK and the other end of the resistor RSK is connected with a negative electrode of the diode DS1.

6. The flyback switching power supply according to claim 3, wherein an emitter of the light-receiving device U5B of the optical coupler II is connected to an emitter of the light-receiving device UQB of the optical coupler I, and a collector thereof is connected to the FB pin of the PWM control integrated circuit.

7. The flyback switching power supply according to claim 6, wherein the optical coupler II and the capacitor C2 are parallel connected between the FB pin and the chip working frequency setting pin of the PWM control integrated circuit U1.

8. The flyback switching power supply according to claim 1, wherein the flyback switching power supply comprises a resistor R11 connected to the chip working frequency setting pin of the PWM control integrated circuit, and the frequency adjustment circuit comprises a resistor RD connected in parallel with the resistor R11 to form a frequency setting resistor of the PWM control integrated circuit.

9. The flyback switching power supply according to claim 8, wherein the frequency adjustment circuit comprises an optical coupler I configured as: when the flyback switching power supply is under a high load condition, a light-emitting device UQA of the optical coupler I is on, a light-receiving device UQB of the optical coupler I is turned on, so that the resistor RD in the frequency adjustment circuit is enabled.

10. The flyback switching power supply according to claim 8, wherein the frequency adjustment circuit comprises an optical coupler I configured as: when the flyback switching power supply is under a low load condition, a light-emitting device UQA of the optical coupler I is off, a light-receiving device UQB of the optical coupler I is off, so that the resistor RD in the frequency adjustment circuit is not enabled.

11. The flyback switching power supply according to claim 9, wherein the flyback switching power supply further comprises a PB signal feed back module connected to FB pin of the PWM control integrated circuit, and wherein the FB signal feed back module comprises an optical coupler II connected parallel with the resistor R11 and at least one resistor RSF.

* * * * *